United States Patent
Taguchi

(10) Patent No.: US 9,525,794 B2
(45) Date of Patent: Dec. 20, 2016

(54) IMAGE FORMING APPARATUS, AND NON-TRANSITORY COMPUTER-READABLE RECORDING MEDIUM

(71) Applicant: KYOCERA Document Solutions Inc., Osaka (JP)

(72) Inventor: Masanori Taguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/069,426

(22) Filed: Mar. 14, 2016

(65) Prior Publication Data
US 2016/0295050 A1    Oct. 6, 2016

(30) Foreign Application Priority Data
Mar. 31, 2015 (JP) ................ 2015-072670

(51) Int. Cl.
*H04N 1/00* (2006.01)
*G06F 3/12* (2006.01)

(52) U.S. Cl.
CPC ........ *H04N 1/00822* (2013.01); *G06F 3/1206* (2013.01); *G06F 3/1243* (2013.01); *G06F 3/1286* (2013.01); *H04N 1/00811* (2013.01); *H04N 2201/0094* (2013.01)

(58) Field of Classification Search
CPC .... H04N 1/822; H04N 1/811; H04N 2201/94; G06F 3/1206; G06F 3/1243; G06F 3/1286
USPC .................................................. 358/1.13
See application file for complete search history.

(56) References Cited

U.S. PATENT DOCUMENTS

| | | | | |
|---|---|---|---|---|
| 6,590,675 B1* | 7/2003 | Tomiyasu | ............... | G06K 15/02 358/1.18 |
| 2002/0114007 A1 | 8/2002 | Hayashi | ....................... | 358/1.18 |
| 2007/0076278 A1* | 4/2007 | Nagarajan | .............. | H04N 1/387 358/538 |
| 2008/0212845 A1* | 9/2008 | Lund | ..................... | G06F 17/243 382/112 |
| 2008/0264701 A1* | 10/2008 | Radtke | ................ | G06F 3/03545 178/19.01 |
| 2014/0111828 A1* | 4/2014 | Ichikawa | ........... | H04N 1/00411 358/1.15 |
| 2015/0170255 A1* | 6/2015 | Sekine | ................... | G06Q 30/04 705/26.81 |

FOREIGN PATENT DOCUMENTS

JP          11-316668 A       11/1999

* cited by examiner

*Primary Examiner* — Jerome Grant, II
(74) *Attorney, Agent, or Firm* — Stein IP, LLC

(57) ABSTRACT

An image forming apparatus is provided which is able to combine a form image with an input image by means of a new combination method. The image forming apparatus is able to combine the form image with the input image by means of a multiple form successive combination method in which in a case where a plurality of the input images are used, when a plurality of the form images are accepted, a respective one of the form images is successively combined with a respective one of the input image, and the multiple form successive combination method is a method in which in a case where the input images to a number of three or more are used, when the form images to a number of three or more are accepted, a respective one of the form images is successively combined with a respective one of the input images.

7 Claims, 9 Drawing Sheets

FIG.4A

| READ IMAGE | P 1 | P 2 | P 3 | . . . |
|---|---|---|---|---|
| FORM IMAGE | P 1 | | | |
| INPUT IMAGE | | P 1 | P 2 | . . . |
| | A | 1 | 2 | . . . |

FIG.4B

| OUTPUT IMAGE | P 1 | P 2 | . . . |
|---|---|---|---|
| | A 1 | A 2 | . . . |

FIG.6A

| READ IMAGE | P1 | P2 | P3 | P4 | P5 | P6 | P7 | P8 | P9 | P10 | P11 | ... |
|---|---|---|---|---|---|---|---|---|---|---|---|---|
| FORM IMAGE | P1 | P2 | P3 | P4 | P5 | | | | | | | |
| INPUT IMAGE | A | B | C | D | E | P1 / 1 | P2 / 2 | P3 / 3 | P4 / 4 | P5 / 5 | P6 / 6 | ... |

FIG.6B

| OUTPUT IMAGE | P1 ABC 1 DE | P2 ABC 2 DE | P3 ABC 3 DE | P4 ABC 4 DE | P5 ABC 5 DE | P6 ABC 6 DE | ... |
|---|---|---|---|---|---|---|---|

FIG.7A

| READ IMAGE | P1 | P2 | P3 | P4 | P5 | P6 | P7 | P8 | P9 | P10 | P11 | ... |
|---|---|---|---|---|---|---|---|---|---|---|---|---|
| FORM IMAGE | P1 | P2 | P3 | P4 | P5 | | | | | | | ... |
| INPUT IMAGE | A | B | C | D | E | 1 | 2 | 3 | 4 | 5 | 6 | ... |

FIG.7B

| OUTPUT IMAGE | P1 | P2 | P3 | P4 | P5 | P6 | ... |
|---|---|---|---|---|---|---|---|
| | A 1 | B 2 | C 3 | D 4 | E 5 | A 6 | ... |

FIG.8A

| | | | | | | | | | |
|---|---|---|---|---|---|---|---|---|---|
| READ IMAGE | P1 | P2 | P3 | P4 | P5 | P6 | P7 | P8 | P9 | ... |
| FORM IMAGE | P1 | P2 | P3 | P4 | P5 | | | | | |
| INPUT IMAGE | | | | | | P1 | P2 | P3 | P4 | ... |
| | A | B | C | D | E | 1 | 2 | 3 | 4 | ... |

FIG.8B

| | | | | |
|---|---|---|---|---|
| OUTPUT IMAGE | P1 | P2 | P3 | P4 | ... |
| | A 1 DE | B 2 DE | C 3 DE | A 4 DE | ... |

IMAGE FORMING APPARATUS, AND NON-TRANSITORY COMPUTER-READABLE RECORDING MEDIUM

INCORPORATION BY REFERENCE

The present application is based on Japanese Patent Application No. 2015-072670 filed on Mar. 31, 2015, the contents of which are hereby incorporated by reference.

BACKGROUND

The present disclosure relates to an image forming apparatus that combines a form image with an input image to generate an output image; and a non-transitory computer-readable recording medium that stores an image forming program.

A typical image forming apparatus is known which combines a form image with an input image to generate an output image.

However, as to the typical image forming apparatus, there is a problem that in a case where there are a plurality of input images and form images, it is impossible to successively combine a respective one of the form images with a respective one of the input images.

In the meantime, in the typical image forming apparatus, when a one-sided document undergoes both-sided copying, it is possible to use different form images for a front side and a rear side, but even when four or more one-sided documents undergo the both-sided copying, only two form images are successively combined on a respective one of a plurality of recording mediums, and it is impossible to successively combine a respective one of three or more form images bridging the plurality of recording mediums.

SUMMARY

An image forming apparatus according to a first aspect of the present disclosure includes: an image combination circuit that combines a form image with an input image to generate an output image; and a form image acceptance circuit that performs a process of accepting the form image used by the image combination circuit. The image combination circuit is able to combine the form image with the input image by means of a multiple form successive combination method in which in a case where there are a plurality of the input images, when a plurality of the form images are accepted by the form image acceptance circuit, a respective one of the form images accepted by the form image acceptance circuit is successively combined with a respective one of the input images, and the multiple form successive combination method is a method in which in a case where the input images to a number of three or more are used, when the form images to a number of three or more are accepted by the form image acceptance circuit, a respective one of the form images accepted by the form image acceptance circuit is successively combined with a respective one of the input images.

A non-transitory computer-readable recording medium according to a second aspect of the present disclosure stores an image forming program that is executable on a computer of an image forming apparatus. When the image forming program is executed, the image forming program operates the computer as an image combination circuit for combining a form image with an input image to generate an output image and as a form image acceptance circuit for accepting the form image that is used by the image combining circuit. The image combination circuit is able to combine the form image with the input image by means of a multiple form successive combination method in which in a case where there are a plurality of the input images, when a plurality of the form images are accepted by the form image acceptance circuit, a respective one of the form images accepted by the form image acceptance circuit is combined with a respective one of the input images, and the multiple form successive combination method is a method in which in a case where the input images to a number of three or more are used, when the form images to a number of three or more are accepted by the form image acceptance circuit, a respective one of the form images accepted by the form image acceptance circuit is successively combined with a respective one of the input images.

BRIEF DESCRIPTION OF THE DRAWINGS

FIG. 4A shows an example of combining a form image with an input image in the MFP shown in FIG. 1 in a case where there is one form image.

FIG. 4B shows an example of an output image combined in FIG. 4A.

FIG. 6A shows an example of combining a form image with an input image in the MFP shown in FIG. 1 when a multiple form concurrent combination method is used in a case where there are a plurality of form images.

FIG. 6B shows an example of an output image combined in FIG. 6A.

FIG. 7A shows an example of combining a form image with an input image in the MFP shown in FIG. 1 when a multiple form successive combination method is used in a case where there are a plurality of form images.

FIG. 7B shows an example of an output image combined in FIG. 7A.

FIG. 8A shows an example of combining a form image with an input image in the MFP shown in FIG. 1 when a multiple form partial successive residual concurrent combination method is used in a case where there are a plurality of form images.

FIG. 8B shows an example of an output image combined in FIG. 8A.

DETAILED DESCRIPTION

Hereinafter, an embodiment of the present disclosure is described by using drawings.

First, a structure of a MFP (Multifunction Peripheral) as an image forming apparatus according to an embodiment of the present embodiment is described.

Figure 1:
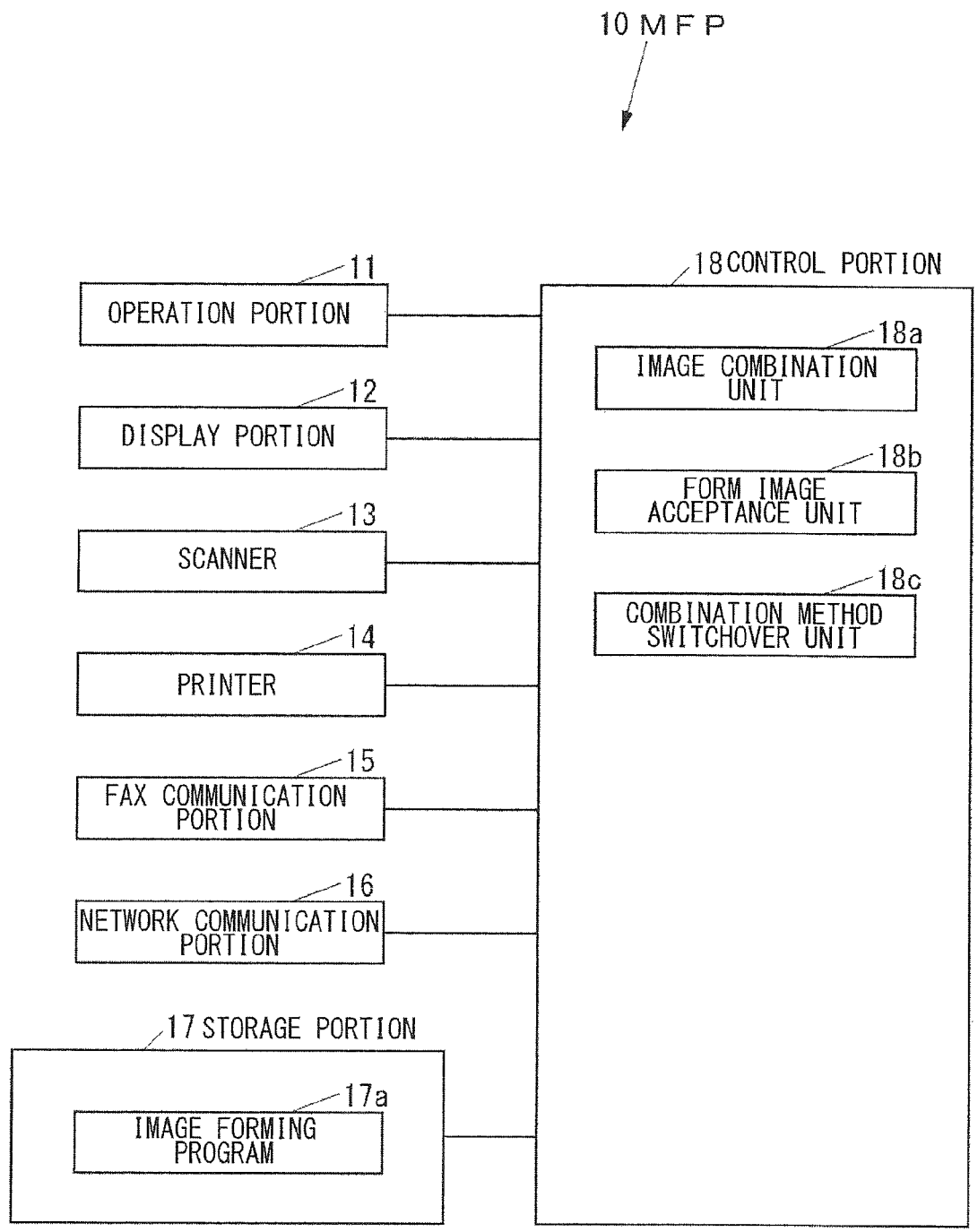
FIG. 1 shows a structure of a MFP according to an embodiment of the present disclosure.

FIG. 1 shows a structure of the MFP 10 according to the present embodiment.

As shown in FIG. 1, the MFP 10 includes: an operation portion 11 that is an input device such as a button and the like on which various kinds of operations are input; a display portion 12 that is a display device such as a LCD (Liquid Crystal Display) and the like which display various kinds of information; a scanner 13 that is a reading device which reads an image from a document; a printer 14 that is a print device which executes printing on a recording medium such as a sheet and the like; a fax communication portion 15 that is a fax device which performs fax communication with an outside facsimile apparatus via communication lines such as a public telephone line and the like; a network communication portion 16 that is a network communication device which performs communication with an outside device via networks such as the internet and the like; a storage portion 17 that is a non-volatile storage device such as an EEPROM (Electrically Erasable Programmable Read Only Memory), a HDD (Hard Disk Drive) or the like that stores various kinds of information; and a control portion 18 that controls an entirety of the MFP 10.

The storage portion 17 has a region for storing a program and data. The storage portion 17 stores an image forming program 17a for controlling the MFP 10. The image forming program 17a may be installed into the MFP 10 on a production stage or may be additionally installed from outside storage mediums such as an SD card, a USB (Universal Serial Bus) memory and the like into the MFP 10, or may be additionally installed from a network.

The control portion 18 includes, for example, a CPU (Central Processing Unit), a ROM (Read Only Memory) that stores a program and various kinds of data, and a RAM (Random Access Memory) used as a working area for the CPU. The CPU executes the program stored in the ROM or storage portion 17.

The control portion 18 executes the image forming program 17a stored in the storage portion 17, thereby operating as: an image combination unit 18a that combines a form image with an input image to generate an output image; a form image acceptance unit 18b that accepts a form image used by the image combination unit 18a; and a combination method switchover unit 18c that switches a combination method which the image combination unit 18a uses to combine a form image with an input image. The image combination unit 18a, the form image acceptance unit 18b, and the combination method switchover unit 18c may have a processor such as a Central Processing Unit (CPU) and the like that have one or a plurality of circuits, are able to read and execute various kinds of programs and also execute various kinds of programs incorporated inside beforehand. Here, the circuit can be an electronic component in which a plurality of electronic elements are connected to one another by wiring, or can be an electronic board in which a plurality of electronic elements are connected.

Next, operation of the MFP 10 is described.

Figure 2:
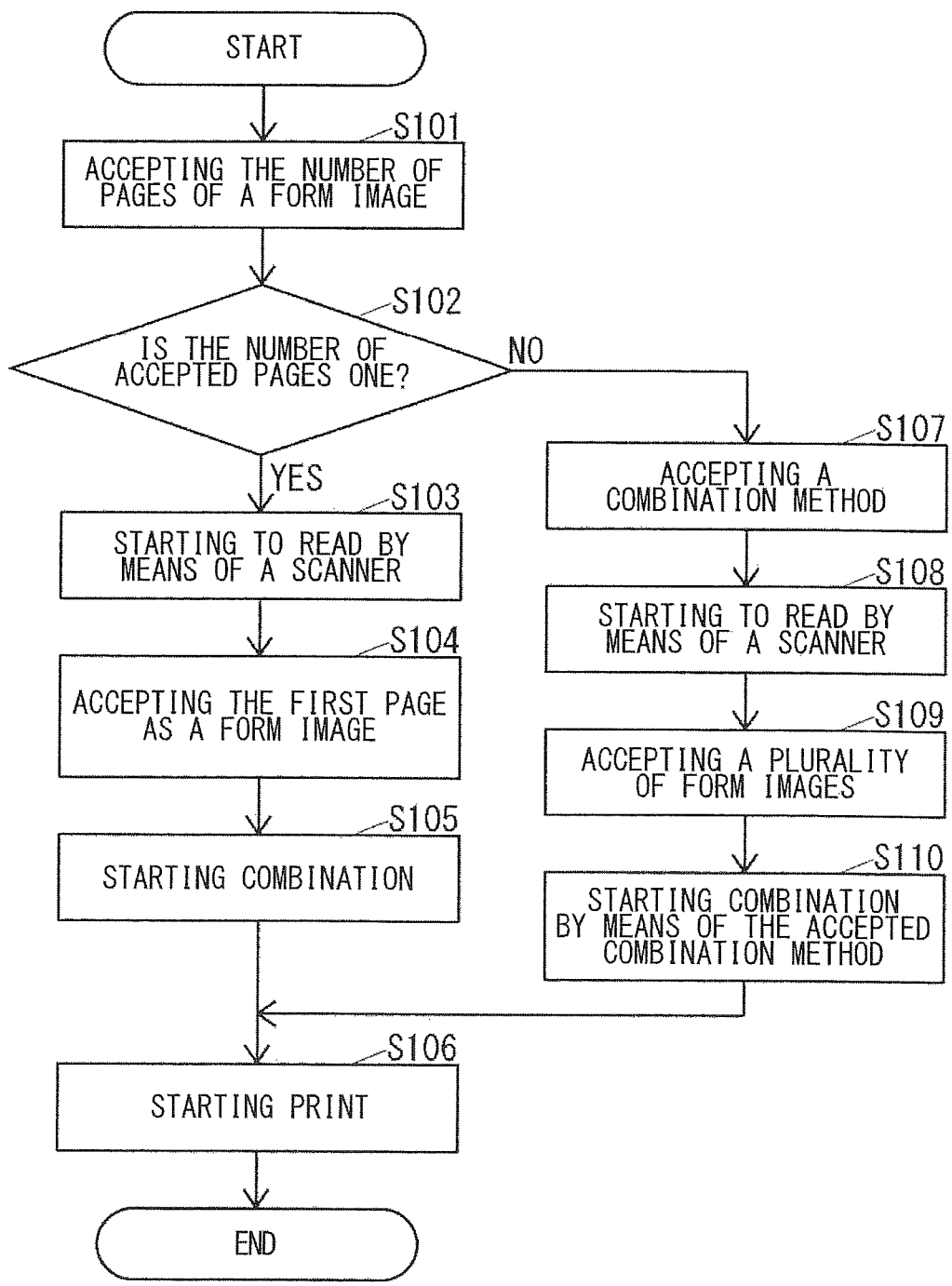
FIG. 2 shows steps in an operation of the MFP shown in FIG. 1 in a case where an output image, which is obtained by combining a form image with an input image read from a document by a scanner, is printed by a printer.

When a command, which is for printing, by means of the printer 14, an output image obtained by combining a form image with an input image that is read from a document by the scanner 13, is input via the operation portion 11, the MFP 10 executes an operation show in FIG. 2.

FIG. 2 shows steps in the operation of the MFP 10 in the case where an output image, which is obtained by combining a form image with an input image read from a document by the scanner 13, is printed by the printer 14.

As shown in FIG. 2, the form image acceptance unit 18b accepts, via the operation portion 11, a designation of the number of pages from a head in a series of reading operations by the scanner 13 as a designation of a page of pages which correspond to respective ones of a plurality of read images obtained by the series of reading operations by the scanner 3 (S101).

Figure 3:
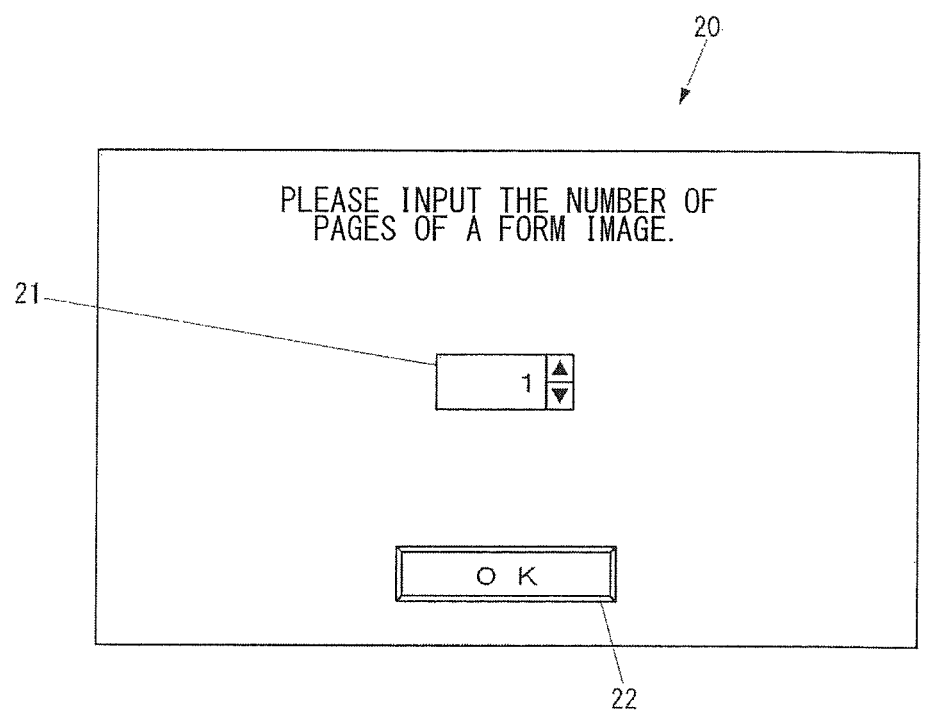
FIG. 3 shows an example of a form image designation screen that is displayed on a display portion shown in FIG. 1.

FIG. 3 shows an example of a form image designation screen 20 that is displayed on the display portion 12 by the form image acceptance unit 18b in the process in the S101.

As shown in FIG. 3, the form image designation screen 20 includes a spin box 21 in which the number of pages of a form image is input and an OK button 22 that forces the form image acceptance unit 18b to accept the number of pages input in the spin box 21.

As shown in FIG. 2, after the process in the S101, the form image acceptance unit 18b determines whether the number of pages accepted in the S101 is one or not (S102).

Upon determining in the S102 that the number of pages accepted is one, the form image acceptance unit 18b starts reading an image from a document by means of the scanner 13 (S103).

Next, the form image acceptance unit 18b accepts a first page of a plurality of read images, which are obtained by the series of reading operations started by the scanner 13 in the S103, as a form image.

Next, the image combination unit 18a starts combining the form image accepted in the S104 with a respective one of the input images (S105). Here, the input images are a second page and following ones of the plurality of read images obtained by the series of reading operations by the scanner 13 started in the S103. In other words, the image combination unit 18a successively accepts the input images, namely, the second page of the read images as the first input image, the third page of the read images as the second input image, and combines the form image with the accepted input images to generate output images.

Next, the image combination unit 18a starts printing, by means of the printer 14, the output images generated by the combination started in the S105 (S106). Upon ending the printing of all the generated output images by means of the printer 14, the image combination unit 18a ends the operation shown in FIG. 2.

FIG. 4A shows an example of combining a form image with an input image in the MFP 10 in a case where there is one form image. FIG. 4B shows an example of the output image combined in FIG. 4A.

In FIG. 4A, P1, P2, P3, . . . mean page 1, page 2, page 3, . . . , respectively. In other words, the first page of the read images corresponds to the first page of the form images. Besides, the second page, third page, . . . of the read images correspond to the first page, second page, . . . of the input images, respectively. In the case where there is one form image as shown in FIG. 4A, the image combination unit 18a combines the form image with a respective one of the input images to generate the output images as shown in FIG. 4B.

When it is determined in the S102 that the number of accepted pages is not one, that is, the number is 2 or more, the combination method switchover unit 18c accepts a method of combining the form image with the input image via the operation portion 11 (S107). Upon accepting the combination method in the S107, the combination method switchover unit 18c switches the combination method used by the image combination unit 18a to the combination method accepted in the S107.

Figure 5:
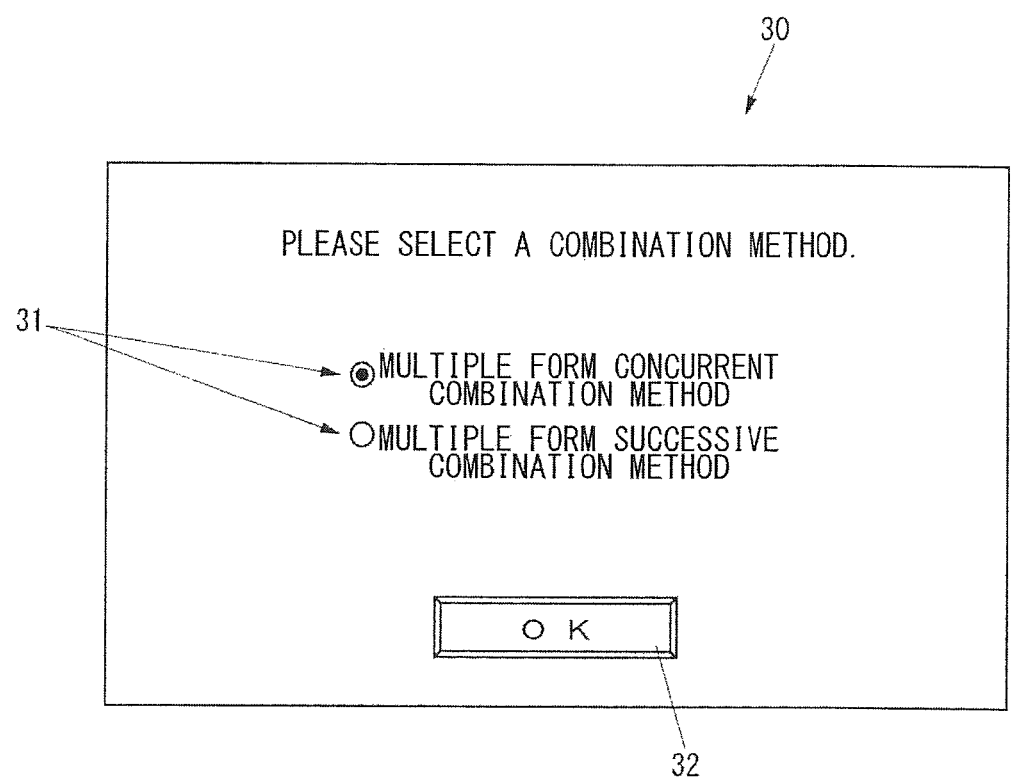
FIG. 5 shows an example of a combination method designation screen displayed on a display portion shown in FIG. 1.

FIG. 5 shows an example of a combination method designation screen 30 displayed on the display portion 12 by the combination method switchover unit 18c in the process in the S107.

As shown in FIG. 5, the combination method designation screen 30 includes: a plurality of radio buttons 31 that are used to select either one of a multiple form concurrent combination method and a multiple form successive combination method described later as the method of combining the form image with the input form; and an OK button 32 that forces the combination method switchover unit 18c to accept the combination method selected by the plurality of radio buttons 31.

As shown in FIG. 2, after the process in the S107, the form image acceptance unit 18b starts reading an image from a document by means of the scanner 13 (S108).

Next, the form image acceptance unit 18b accepts, as a form image, each of read images for the number of pages from the head accepted in the S101 of a plurality of read images obtained by the series of reading operations by the scanner 13 started in the S108 (S109). In other words, the form image acceptance unit 18b successively accepts the plurality of read images, namely, the first page of the read images as the first page of the form image, the second page of the read images as the second page of the form image.

Next, the image combination unit 18a starts combining the form image accepted in the S109 with a respective one of the input images by means of the combination method accepted in the S107 (S110). Here, the input images are read images on pages, after the form image, of the plurality of read images obtained by the series of reading operations by the scanner 13 started in the S108. For example, in a case where the form image has five pages, the image combination unit 18a successively accepts the input images, namely, the sixth page of the read images as the first input image, the seventh page of the read images as the second input image, and combines the form image with the accepted input images to generate output images.

Next, the image combination unit 18a starts printing, by means of the printer 14, the output images generated by the combination started in the S110 (S106). Upon ending the printing of all the generated output images by means of the printer 14, the image combination unit 18a ends the operation shown in FIG. 2.

FIG. 6A shows an example of combining a form image with an input image in the MFP 10 when the multiple form concurrent combination method is used in a case where there are a plurality of form images. FIG. 6B shows an example of the output image combined in FIG. 6A.

In FIG. 6A, P1, P2, P3, . . . mean page 1, page 2, page 3, . . . , respectively. In other words, the first page, second page, . . . , and fifth page of the read images correspond to the first page, second page, . . . , and fifth page of the form images, respectively. Besides, the sixth page, seventh page, . . . of the read images correspond to the first page, second page, . . . of the input images, respectively. The multiple form concurrent combination method is a method in which in the case where there are a plurality of input images and a plurality of form images, all the form images are combined with a respective one of the input images. Accordingly, in the case where the image combination unit 18a uses the multiple form concurrent combination method, for example, as shown in FIG. 6A, when there are five form images, as shown in FIG. 6B, the output images are generated by combining all the form images with a respective one of the input images.

FIG. 7A shows an example of combining a form image with an input image in the MFP 10 when the multiple form successive combination method is used in the case where there are a plurality of form images. FIG. 7B shows an example of the output image combined in FIG. 7A.

In FIG. 7A, P1, P2, P3, . . . mean page 1, page 2, page 3, . . . , respectively. In other words, the first page, second page, . . . , and fifth page of the read images correspond to the first page, second page, . . . , and fifth page of the form images, respectively. Besides, the sixth page, seventh page, . . . of the read images correspond to the first page, second page, . . . of the input images, respectively. The multiple form successive combination method is a method in which in the case where there are a plurality of input images and form images, a respective one of the form images are successively combined with a respective one of the input images. Accordingly, in the case where the image combination unit 18a uses the multiple form successive combination method, for example, as shown in FIG. 7A, when there are five form images, as shown in FIG. 7B, the output images are generated by successively combining a respective one of the form images with a respective one of the input images.

As described above, in not only the case where there are two form images but also in the case where there are three form images or more, the MFP 10 is able to successively combine, by means of the multiple form successive combination method, a respective one of the form images with a respective one of the input images as shown in FIG. 7A, FIG. 7B. Accordingly, it is possible to combine the form image with the input image by means of the multiple form successive combination method that is a new combination method.

The MFP 10 is able to perform the switchover between the multiple form concurrent combination method and the multiple form successive combination method as the method of combining the form image with the input image.

In the meantime, if it is possible to switch to any one of a plurality of combination method including the multiple form successive combination method, the MFP 10 may employ another combination method in place of the multiple form concurrent combination method or in addition to the multiple form concurrent combination method. For example, the combination method switchover unit 18c may be able to switch to a multiple form partial successive concurrent combination method in which in the case where there are a plurality of input images and form images, a respective one of a plurality of form images, which are a part of the form images accepted in the S109, is successively combined with a respective one of the input images, and all of form images, which are a residual of the form images accepted in the S109, are combined with a respective one of the input images. According to this structure, the MFP 10 is able to combine the form image with the input image by means of the multiple form partial successive residual concurrent combination method that is a new combination method.

FIG. 8A shows an example of combining a form image with an input image in the MFP 10 when the multiple form partial successive residual concurrent combination method is used in the case where there are a plurality of form images. FIG. 8B shows an example of the output image combined in FIG. 8A.

In FIG. 8A, P1, P2, P3, . . . mean page 1, page 2, page 3, . . . , respectively. In other words, the first page, second page, . . . , and fifth page of the read images correspond to the first page, second page, . . . , and fifth page of the form images, respectively. Besides, the sixth page, seventh page, . . . of the read images correspond to the first page, second page, . . . of the input images, respectively. In the case where the image combination unit 18a uses the multiple form partial successive concurrent combination method, for example, as shown in FIG. 8A, when there are five form images, as shown in FIG. 8B, the output images are generated by successively combining a respective one of the head three form images with a respective one of the input images, and generated by combining all of the fourth and fifth form images from the head with a respective one of the input images. In the meantime, in the case where the multiple form partial successive concurrent combination method is used, the image combination unit 18a is able to accept beforehand, via the operation portion 11, information indicating which one of the form images is successively combined with a respective one of the input images.

In the meantime, in the case where a respective one of the form images is successively combined with a respective one of the input images by means of the multiple form successive combination method, when the number of the form images is smaller than the number of the input images, the image combination unit 18a is able to employ an arbitrary method as the method of combing the form image with the input image after combining the form image with the input image by one round. For example, after combining a respective one of the form images with the input image by one round, the image combination unit 18a may employ a method of combining successively repeatedly the form image with a respective one of the following input images in the same way.

Besides, in the case where a respective one of the form images is successively combined with a respective one of the input images by means of the multiple form successive combination method, when the number of the form images is larger than the number of the input images, the image combination unit 18a successively combines a respective one of only form images from the head of the plurality of the form images, the number of which is equal to the number of the input images, with a respective one of the input images.

In the present embodiment, the combination method switchover unit 18c accepts the method of combining the form image with the input image via the operation portion 11. However, the combination method switchover unit 18c may automatically switch the combination method based on a relationship between the number of the input images and the number of the form images accepted in the S109. For example, in the case where the number of the form images accepted in the S109 is smaller than the number of the input images, the combination method switchover unit 18c may switch the method of combining the form image with the input image to the multiple form concurrent combination method. According to this structure, the MFP 10 automatically switches the method of combining the form image with the input image. Accordingly, it is possible to improve convenience.

In the meantime, in the case where there are a plurality of form images, the MFP 10 may be unable to switch to a combination method other than the multiple form successive combination method, and the multiple form successive combination method may be necessarily used.

In the present embodiment, the form image acceptance unit 18b accepts the designation of the number of pages from the head in the series of reading operations by the scanner 13 (S101), thereby accepting the read images, as the plurality of form images, from the head in the series of reading operations by the scanner 13 for the number of pages (S109). According to this structure, the MFP 10 lets a user perform the designation of a plurality of pages, which are a part of the pages corresponding to the respective ones of the plurality of read images obtained by the series of reading operations by the scanner 13, which correspond to the form images by means of the designation of the number of pages which is an easy designation method. Accordingly, it is possible to improve the convenience.

In the meantime, the form image acceptance unit 18b may be specifically commanded via the operation portion 11 which page of the read images obtained by the series of reading operations by the scanner 13 to accept as the form image. In this case, the form image may not be the head-side read image in the series of the reading operations by the scanner 13.

In the present embodiment, the form image acceptance unit 18b accepts the designation of a plurality of pages which are a part of the pages corresponding to the respective ones of the plurality of read images obtained by the series of reading operations by the scanner 13 and correspond to the form images, thereby accepting the plurality of form images (S101 and S109). According to this structure, the MFP 10 is able to concurrently accept the input image and the plurality of form mages by means of the series of reading operations by the scanner 13. Accordingly, it is possible to improve the convenience.

Figure 9A:
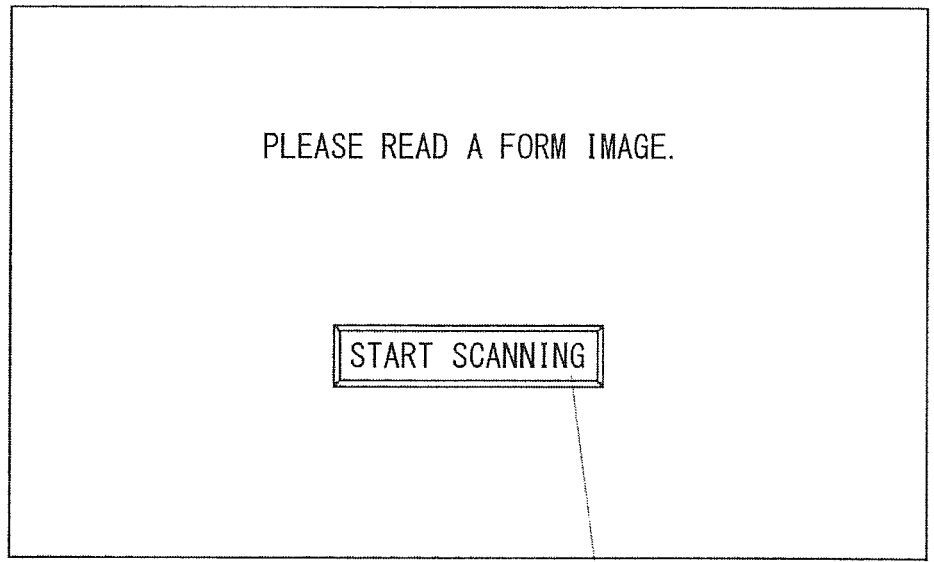
FIG. 9A shows an example of a screen displayed on a display portion shown in FIG. 1 in a case where an input image and a form image are not accepted concurrently by a series of reading operations performed by a scanner.
Figure 9B:
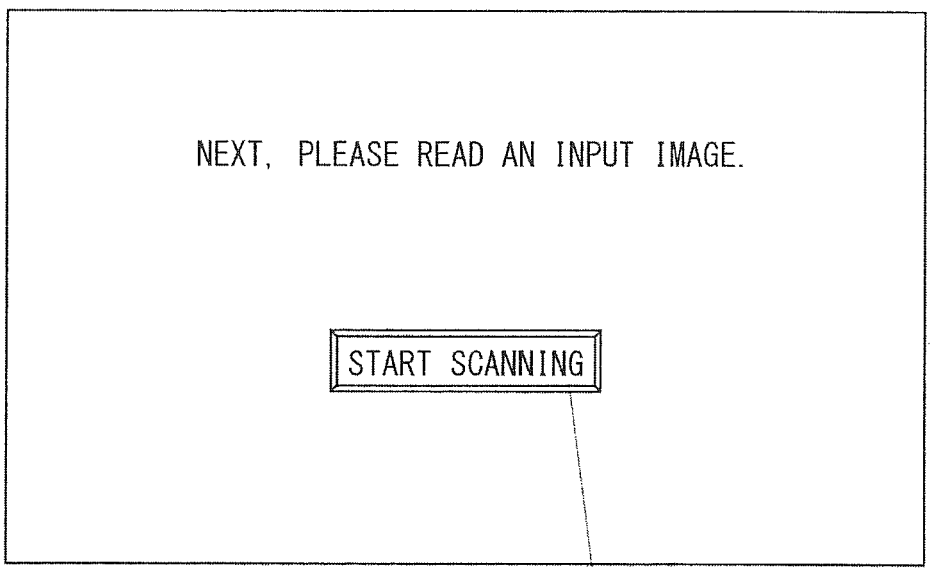
FIG. 9B shows an example of a screen displayed on a display portion shown in FIG. 1 in a case where an input image and a form image are not accepted concurrently by a series of reading operations performed by a scanner.

In the meantime, the MFP 10 may not accept the input image and the form image by means of the series of reading operations by the scanner 13. For example, the MFP 10 may display a screen shown in FIG. 9A on the display portion 12 to let the user read the form image by means of the scanner 13, thereafter, may display a screen shown in FIG. 9B on the display portion 12 to let the user read the input image by means of the scanner 13. In FIG. 9A, 9B, a button 41 is a button for starting the reading of an image by means of the scanner 13.

The MFP 10 may use a form image other than the form image read by the scanner 13. For example, the MFP 10 may use a form image that is input from outside via the network communication portion 16, or may use a form image that is stored beforehand in the storage portion 17.

Likewise, the MFP 10 may use an input image other than the input image read by the scanner 13. For example, the MFP 10 may use an input image that is input from outside via the network communication portion 16, or may use an input image that is stored beforehand in the storage portion 17.

The image forming apparatus according to the present disclosure is the MFP in the present embodiment, but other image forming apparatuses such a printer-dedicated apparatus, a copy-dedicated apparatus and the like other than the MFP may be used if they are image forming apparatuses that are able to combine a form image with an input image to generate an output image.

As describe above, the image forming apparatus (MFP 10) according to the present disclosure includes: the image combination unit 18a that combines a form image with an input image to generate an output image; and the form image acceptance unit 18b that accepts the form image used by the image combination unit 18a; wherein the image combination unit 18a is able to combine the form image with the input image by means of the multiple form successive combination method in which in the case where there are a plurality of the input images, when a plurality of the form images are accepted by the form image acceptance unit 18b, a respective one of the form images accepted by the form image acceptance unit 18b is combined with a respective one of the input images; and the multiple form successive combination method is a method in which in the case where the input images to the number of three or more are used, when the form images to the number of three or more are accepted by the form image acceptance unit 18b, a respective one of the form images accepted by the form image acceptance unit 18b is successively combined with a respective one of the input images.

According to this structure, in not only the case where there are two form images but also in the case where there are three form images or more, the image forming apparatus (MFP 10) according to the present disclosure is able to successively combine, by means of the multiple form successive combination method, a respective one of the form images with a respective one of the input images. Accordingly, it is possible to combine the form image with the input image by means of the multiple form successive combination method that is a new combination method.

Besides, the image forming apparatus (MFP 10) according to the present disclosure includes the combination method switchover unit 18c that switches the method of combining the form image with the input image performed by the image combination unit 18a, wherein the combination method switchover unit 18c may be able to switch a plurality of the combination methods that include the multiple form successive combination method.

According to this structure, the image forming apparatus (MFP 10) according to the present disclosure is able to switch the method of combining the form image with the input image. Accordingly, it is possible to improve the convenience.

Besides, in the image forming apparatus (MFP 10) according to the present disclosure, in the case where the input image and the form image are obtained as read images by a series of reading operations by a reading device, the form image acceptance unit 18b may accept a designation of a plurality of pages which are a part of the pages corresponding to respective ones of a plurality of the read images obtained by the series of reading operations and correspond to the form images, thereby accepting a plurality of the form images.

According to this structure, the image forming apparatus (MFP 10) according to the present disclosure is able to concurrently accept the input image and the plurality of form images by means of the series of reading operations by the reading device. Accordingly, it is possible to improve the convenience.

Besides, in the image forming apparatus (MFP 10) according to the present disclosure, the form image acceptance unit 18b may accept a designation of the number of pages from the head in the series of reading operations, thereby accepting, as a plurality of the form images, the read images for the number of pages from the head in the series of reading operations.

According to this structure, the image forming apparatus (MFP 10) according to the present disclosure lets the user perform the designation of a plurality of pages, which are a part of the pages corresponding to the respective ones of the plurality of read images obtained by the series of reading operations by the reading device and correspond to the form images, by means of the designation of the number of pages which is an easy designation method. Accordingly, it is possible to improve the convenience.

Besides, in the image forming apparatus (MFP 10) according to the present disclosure, the combination method switchover unit 18c may be able to be switched to the multiple form partial successive residual concurrent combination method in which in the case where a plurality of the input images are used, when a plurality of the form images are accepted by the form image acceptance unit 18b, a respective one of a plurality of the form mages, which is a part of the form images accepted by the form image acceptance unit 18b, is successively combined with a respective one of the input images, and all of form images that are residuals of the form images accepted by the form image acceptance unit 18b are combined with a respective one of the input images.

According to this structure, the image forming apparatus (MFP 10) according to the present disclosure is able to combine the form image with the input image by means of the multiple form partial successive residual concurrent combination method that is a new combination method.

Besides, in the image forming apparatus (MFP 10) according to the present disclosure, the combination method switchover unit 18c may automatically switch the combination method based on a relationship between the number of the input images and the number of the form images accepted by the form image acceptance unit 18b.

According to this structure, the image forming apparatus (MFP 10) according to the present disclosure automatically switches the method of combining the form image with the input image. Accordingly, it is possible to improve the convenience.

The image forming program 17a according to the present disclosure operates a computer of an image forming apparatus as the image forming unit 18a for combining a form image with an input image to generate an output image and as the form image acceptance unit 18b for accepting the form image that is used by the image combining unit 18a, wherein the image combination unit 18a is able to combine the form image with the input image by means of the multiple form successive combination method in which in a case where there are a plurality of the input images, when a plurality of the form images are accepted by the form image acceptance unit 18b, a respective one of the form images accepted by the form image acceptance unit 18b is successively combined with a respective one of the input images, and the multiple form successive combination method is a method in which in a case where the input images to the number of three or more are used, when the form images to the number of three or more are accepted by the form image acceptance unit 18b, a respective one of the form images accepted by the form image acceptance unit 18b is successively combined with a respective one of the input images.

According to this structure, when the image forming program 17a having the above structure is used to execute each process, in not only the case where there are two form images but also in the case where there are three form images or more, the image forming program 17a makes the image forming apparatus (MFP 10) successively combine, by means of the multiple form successive combination method, a respective one of the form images with a respective one of the input images. Accordingly, it is possible to combine the form image with the input image by means of the multiple form successive combination method that is a new combination method.

In other words, according to the image forming apparatus and non-transitory computer-readable storage medium according to the present disclosure that stores the image forming program, it is possible to combine the form image with the input image by means of the new combination method.

What is claimed is:

1. An image forming apparatus comprising:
an image combination circuit that combines a form image with an input image to generate an output image, and
a form image acceptance circuit that performs a process of accepting the form image used by the image combination circuit, wherein
the image combination circuit is able to combine the form image with the input image by means of a multiple form successive combination method in which in a case where there are a plurality of the input images, when a plurality of the form images are accepted by the form image acceptance circuit, a respective one of the form images accepted by the form image acceptance circuit is successively combined with a respective one of the input images, and
the multiple form successive combination method is a method in which in a case where the input images to a number of three or more are used, when the form images to a number of three or more are accepted by the form image acceptance circuit, a respective one of the form images accepted by the form image acceptance circuit is successively combined with a respective one of the input images.

2. The image forming apparatus according to claim 1, comprising
a combination method switchover circuit that performs a process of switching the method of combining the form image with the input image performed by the image combination circuit, wherein
the combination method switchover circuit is able to switch a plurality of the combination methods that include the multiple form successive combination method.

3. The image forming apparatus according to claim 1, wherein
if the input image and the form image are obtained as read images by a series of reading operations by a reading device, the form image acceptance circuit accepts a designation of a plurality of pages which are a part of pages corresponding to respective ones of a plurality of the read images obtained by the series of reading operations and correspond to the form images, thereby performing a process of accepting a plurality of the form images.

4. The image forming apparatus according to claim 3, wherein
the form image acceptance circuit accepts a designation of a number of pages from a head in the series of reading operations, thereby performing a process of accepting, as a plurality of the form images, the read images for the number of pages from the head in the series of reading operations.

5. The image forming apparatus according to claim 2, wherein
the combination method switchover circuit is able to be switched to a multiple form partial successive residual concurrent combination method in which in the case where a plurality of the input images are used, when a plurality of the form images are accepted by the form image acceptance circuit, a respective one of a plurality of the form images, which is a part of the form images accepted by the form image acceptance circuit, is successively combined with a respective one of the input images, and all of form images that are residuals of the form images accepted by the form image acceptance circuit are combined with a respective one of the input images.

6. The image forming apparatus according to claim 2, wherein
the combination method switchover circuit performs a process of automatically switching the combination method based on a relationship between a number of the input images and a number of the form images accepted by the form image acceptance circuit.

7. A non-transitory computer-readable recording medium that stores an image forming program executable on a computer of an image forming apparatus,
when the image forming program is executed, the image forming program operating the computer as:
an image combination circuit for combining a form image with an input image to generate an output image; and
a form image acceptance circuit for accepting the form image that is used by the image combining circuit, wherein
the image combination circuit is able to combine the form image with the input image by means of a multiple form successive combination method in which in a case where there are a plurality of the input images, when a plurality of the form images are accepted by the form image acceptance circuit, a respective one of the form images accepted by the form image acceptance circuit is successively combined with a respective one of the input images, and
the multiple form successive combination method is a method in which in a case where the input images to a number of three or more are used, when the form images to a number of three or more are accepted by the form image acceptance circuit, a respective one of the form images accepted by the form image acceptance circuit is successively combined with a respective one of the input images.

* * * * *